Dec. 24, 1940.                J. P. BEDFORD                2,225,732
                              VEHICLE SIGNAL
                            Filed Feb. 9, 1939
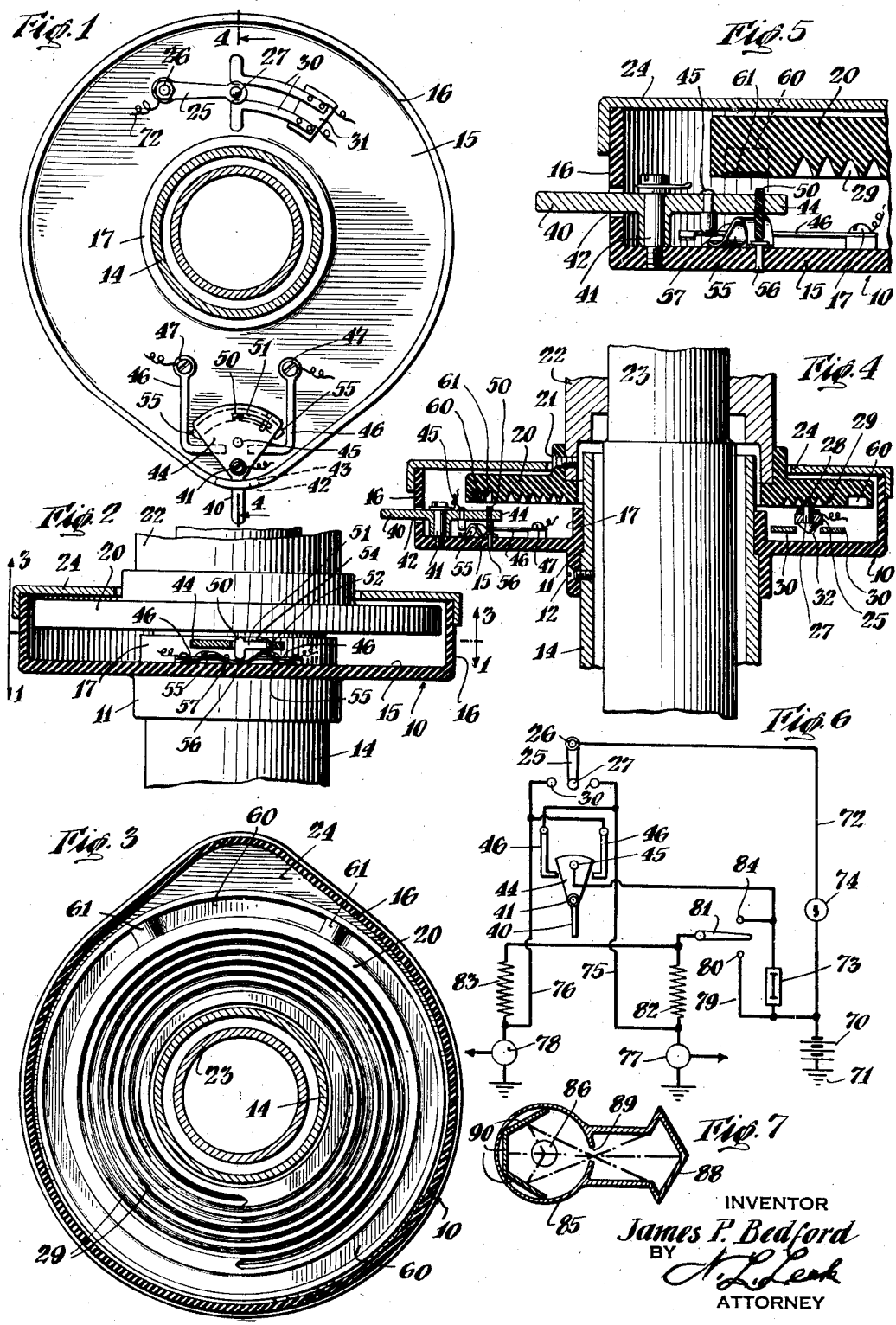
INVENTOR
James P. Bedford
BY
ATTORNEY Patented Dec. 24, 1940

2,225,732

UNITED STATES PATENT OFFICE 2,225,732

VEHICLE SIGNAL

James P. Bedford, Scranton, Pa.

Application February 9, 1939, Serial No. 255,417

8 Claims. (Cl. 200—59)

This invention relates to vehicle signals and more particularly to a directional signal system for motor vehicles and to a novel and improved controller for operating the same.

An object of the invention is to provide a novel and improved directional signal system which is operable both manually and automatically for indicating a proposed turn.

Another object is to provide a signal system for motor vehicles or the like in which the same signal light is used for a plurality of different purposes.

Another object is to provide a system of the above type in which a single pair of signal lights may be used for a combination stop light, tail light, automatic directional signal and manual directional signal.

Another object is to provide a controller having novel and improved features of construction and characteristics of operation.

A further object is to provide a controller for the above purpose which is neat and pleasing in appearance and comprises a minimum number of parts.

Another object is to provide a controller of the type above indicated having a manual control switch for actuating a directional signal and having means for automatically restoring said switch to neutral position when the turn has been completed.

Various other objects and advantages will be apparent as the nature of the invention is more fully disclosed.

Although the novel features which are believed to be characteristic of this invention will be pointed out more particularly in the claims appended hereto, the invention will be better understood by referring to the following description, taken in connection with the accompanying drawing, in which a specific embodiment thereof has been set forth for purposes of illustration.

In the drawing,

Fig. 1 is a horizontal section through the controller taken along the line 1—1 of Fig. 2;

Fig. 2 is a front elevation of the controller with the housing shown in section.

Fig. 3 is a horizontal section taken along the line 3—3 of Fig. 2 and showing the top rotating disc;

Fig. 4 is a transverse section taken along the line 4—4 of Fig. 1;

Fig. 5 is an enlarged detail view of the manual switch mechanism;

Fig. 6 is a schematic circuit diagram showing the signal system; and

Fig. 7 is a detail view showing the construction of the signal light.

Referring more particularly to the drawing, the specific embodiment of the invention therein disclosed comprises a housing 10 having a depending sleeve 11 which is attached, as by a screw 12, to the stationary steering post 14 of a vehicle. The housing 10 is formed with an annular shaped base 15, a peripheral flange 16 and a central flange 17 which extends upwardly to form a spacing member and guide for the rotating disc to be described and to facilitate the assembly and installation of the device. A disc 20, located within the housing 10, is attached by screws 21 to the hub 22 of the steering wheel which rotates with the steering shaft 23. The housing 10 may be closed by a cover 24.

The automatic switch for controlling the directional signal when the steering wheel is turned comprises a lever 25 pivoted as at 26 to the base 15 and carrying a contact pin 27 having a wedge shaped end 28 engaging a spiral V-thread 29 formed in the bottom of the disc 20. The V-thread 29 is provided with a number of convolutions corresponding to the total number of turns of the steering wheel from full right to full left position. In some instances, this may amount to six full turns. It is to be understood that the apex of the thread 29 may be slightly rounded to prevent the pin 27 from binding therein, or the thread and the corresponding portion of the pin may be of other suitable shapes, such as square or rectangular, if desired. A pair of spring contact strips 30 are attached to the base 15 by suitable means, such as an insulating block 31. These contact strips extend on opposite sides of the head 32 of the contact pin 27 in a position such that a wiping contact is made with said head when the pin 27 is shifted from its center position due to the turning of the steering wheel to the right or left. The head 32 may have a bevelled or rounded contour to cause the same to readily engage and slide over the contact strips 30. It is to be understood that the strips 30 have sufficient resilience to maintain a firm contact with the head 32 and to hold the pin 27 securely seated in the thread 29 in the event that the parts should become somewhat worn.

The manual switch mechanism comprises a lever 40 pivoted to the base 15 by a post 41 and projecting to the outside of the housing 10 in a readily accessible position. The peripheral flange 16 may be provided with an opening 42, Fig. 1, through which the lever 40 passes and the edges 43 of the flange may provide a stop to limit the movement of said lever. The lever 40 is shown as provided with an enlarged triangular part 44 within the housing 10 carrying a contact pin 45 which engages one of a pair of spring contact strips 46 when the lever 40 is moved to the right or left. The strips 46 may be attached to the base 15 by suitable means such as screws 47.

The enlarged part 44 of the lever 40 also carries a reset pin 50 (Fig. 2) forming a part of an arm 51 which is pivoted as at 52 to said part 44 and is normally held in a retracted position by a spring 54. The pin 50 is adapted to engage a pair of spring clips 55 which are attached, as at 56, to the base 15 and are provided with inclined surfaces 57 on which the pin 50 rides when the lever 40 is shifted to the right or left. The pin 50, when elevated by the inclined surfaces 57, is adapted to enter an annular recess 60 formed in the underside of the disc 20. The annular recess 60 is provided with a pair of bridge or cam members 61 which are adapted to engage the raised pin 50 when the disc is turned. The cam members 61 are provided with bevelled surfaces which depress the pin 50 against the spring clips 55 when the disc 20 is turned in one direction, but which engage the pin for restoring the lever 40 to center position when the disc 20 is turned in the opposite direction, as will be described. The housing 10 and disc 20 may, of course, be split for convenience of installation if desired.

The signal circuit shown in Fig. 6 comprises a battery 70 grounded, as at 71, to the frame of the vehicle and connected by a lead 72 to the lever 25, above mentioned, and through an interrupter 73 of any suitable type, such as a variable resistance link or an intermediately operated make and break device, to the contact pin 45. The right and left contact strips 30 and 46 are respectively connected by lines 75 and 76 to a pair of directional signal lights 77 and 78 respectively. The usual ignition switch 74 may be connected in the lead 72 so as to prevent the signals from remaining energized while the car is parked with the front wheels turned or with the manual switch closed.

The battery 70 is also connected by a lead 79 to a contact 80 engaging a switch arm 81 which is connected through resistances 82 and 83 to the signal lights 77 and 78, the contact 80 and arm 81 constituting the tail light switch. A circuit is also made through the interrupter 73, a contact 84, the arm 81 and the resistances 82 and 83, to the signal lights, the contact 84 and arm 81 constituting the stop light switch.

The directional signals 77 and 78 may be of the general construction illustrated in Fig. 7 which shows a circular housing 85 at the center of which a light bulb 86 is located. A housing 88, in the general form of an arrow, is mounted on the side of the housing 85. The housing 85 is provided with means to admit a restricted amount of light rays from bulb 86 into the housing 88. In the embodiment shown, an aperture 89, preferably in the form of a narrow slit, is provided for this purpose. A set of reflectors 90 may be positioned in the housing 85 to focus and direct the rays from the bulb 86 through the aperture 89 into the housing 88. The reflectors may be omitted if sufficient light is otherwise made available at the aperture 89 to illuminate the housing 88.

Operation

The operation of the above described system is as follows:

Referring first to Fig. 7, the arrangement is such that when the bulb 86 is energized at a low intensity (through the resistances 82 and 83, Fig. 6), the interior of the housing 85 is illuminated and the light is visible through the cover thereof and constitutes the stop or tail light. The intensity of illumination, however, is sufficiently low so that the rays passing through the slot 89 do not appreciably illuminate the housing 88. When the bulb 86 is energized at full intensity, the interior of the housing 85 is illuminated more brilliantly and, due to the reflectors 90, sufficient light is passed through the slot 89 to also illuminate the housing 88, which is thus made visible through a cover glass or the like as an illuminated arrow and constitutes the directional signal.

Referring now to the circuit shown in Fig. 6, it will be noted that when the arm 81 engages the contact 80, a circuit is completed from the battery 70 through the resistances 82 and 83 to the signal lights 77 and 78, thereby energizing both of said lights at a low intensity and causing the housing 85 thereof to be illuminated in the manner above described, thus forming the tail lights of the vehicle.

The application of the brake or the like causes the lever 81 to engage the contact 84, thereby completing the circuit from the battery 70 through the interrupter 73 and the resistances 82 and 83 to the lights 77 and 78. This causes a flashing light of low intensity, which constitutes the stop light signal.

When the manual lever 40 is operated, the contact pin 45 is brought into engagement with either the right or the left contact strip 46. A circuit is thus completed from the battery 70 through the interrupter 73 to one of the lights 77 or 78, cutting out the corresponding resistance 82 or 83 and energizing the selected right at high intensity, thereby rendering the directional arrow visible and producing a flashing directional signal.

When the automatically controlled contact pin 27 is brought into contact with the right or left contact strip 30, a circuit is completed from the battery 70 direct to the selected signal light 77 or 78, thereby short circuiting the interrupter 73 and producing a steady light of high intensity. The directional signal accordingly changes from a flashing light to a steady light.

In this way, the same bulb is utilized to produce either a steady tail light of low intensity or a flashing stop light of low intensity or a steady or flashing directional signal of high intensity. To the observer, the housing 85 would normally be visible when the tail light circuit is closed and would show as a pair of tail lights of usual form. The flashing of these tail lights would constitute the stop signal. A directional signal, indicating a proposed turn would be given by one of the lights becoming more brilliant, the arrow becoming visible and flashing. When the turn is actually initiated, the flashing of the directional signal stops and a steady signal is given thereafter.

The controller for actuating the contacts 27 and 45, as shown and described more in detail in connection with Figs. 1 to 5, includes the lever 25, which is automatically actuated by the threads 29 when the disc 20 turns with the steering wheel. With the wheel in straight ahead position, the pin 27 is centrally located, as shown in Fig. 4, and the contacts 30 are both open. When the wheel is turned to the right or left the pin 27 is shifted to the right or left, as viewed in Fig. 4, and makes contact with one of the contact strips 30, thereby energizing the automatic directional signal circuit, above described. It is to be understood that the contact strips 30 are so spaced from the pin 27 as to cause the contacts to be closed when the wheel has been turned a predetermined amount to the right or left, such, for example, as a quarter of a revolution. The contacts 30 are accordingly automatically closed or opened, depending upon the position of the steering wheel.

For manually giving a directional signal, the driver shifts the lever 40 to the right or left, depending on the direction of the proposed turn. If the lever is shifted to the left, for example, the contact strip 46, located on the right, is closed. This, as shown in Fig. 6, energizes the left-hand signal light 78 and causes a flashing directional signal to be given. When the lever is thus thrown to the left the pin 50, riding up on the inclined surface 57 of the spring clip 55, is raised into the annular groove 60 of the disc 20. When the steering wheel is turned to the left for making the proposed turn, the cam members 61 engage the top of the pin 50 as they pass thereover. Inasmuch as the lever 40 is already thrown to its stop position, further movement thereof is prevented and the cam surfaces 61 merely depress the pin 50 against the spring 55 and permit the disc to ride thereover. After the turn has been completed, however, and the steering wheel is turned to the right for straightening the vehicle, the cam surfaces 61 engage the pin 50 from the opposite direction and shift the pin back to its center position, at which point the pin has left the inclined surface 57 and is retracted from further contact with the cam surfaces 61. This return movement may be facilitated by so designing the spring members 55 that the pin 50 remains on the inclined surface 57, so that a minimum amount of friction is presented to the return movement thereof. It is evident, in this construction, that the directional signal is manually set by movement of the lever 40, but is automatically reset when the steering wheel is restored to straight ahead position after making the turn. It may, of course, be reset manually if the operator desires to restore the signal without first making the proposed turn.

If the operator gives the proper signal, the turn is indicated by a flashing signal preceding the actual turn which becomes a steady signal when the turn is begun. If, however, the operator neglects to give the manual signal, the steady directional signal will be automatically given as a warning that the turn has been begun and also as an indication to a remote observer that the driver has neglected to give the proper signal prior to initiating the turn. By noting the duration of the flashing signal, the elapsed time between the giving of the manually operated signal by the driver and the actual beginning of the turn may be ascertained. This feature may be of importance, for example, to inspectors of fleets of busses or trucks or to traffic officers.

The controller provides a simple and effective device for giving both the manual and the automatic directional signal. It is simple in construction, constituting essentially a rotatable disc and a stationary housing. Obviously, the disc may be varied in design. It may, for example, take the form of a rotating sleeve with helical threads in which case the pin 27 would be movable axially. Other means may also be employed for restoring the manual switch. The controller may be mounted above the steering wheel, if desired, and may in certain instances be contained under a collar surrounding the horn button.

It is to be understood, of course, that this controller may be used with various types of signal circuits and is not restricted to use with the signal circuit shown in Fig. 6. The controller may, for example, be used with a semaphore signal or may be so designed that the automatic and manual switches actuate different signals which may be independent of the stop and tail lights. The system as set forth in Figs. 6 and 7 is given merely as an illustration of one embodiment of the invention. It is also to be understood that the various details of construction of the controller may be varied as desired. A specific embodiment has been given for purposes of illustration only and not as a limitation on the scope of the invention. The invention is to be limited only in accordance with the following claims.

What is claimed is:

1. A directional controller for vehicles having a steering wheel and a steering post which comprises a housing attached to the steering post, a member within said housing attached to said wheel and rotatable therewith, a double-throw switch having a movable contact and a pair of stationary contacts, means associated with said rotatable member to shift said movable contact into engagement with a selected stationary contact when the wheel is turned to the right or left from straight ahead position and to restore said movable contact to a neutral position when the wheel is returned to a straight ahead position, a manual double-throw switch having contacts independent of said first contacts for operating a second signal mounted on said housing and operable by the operator of the vehicle to indicate a proposed turn to the right or left, means actuated by said rotatable member for restoring said manual switch, and means rendering said last means inoperative when said rotatable member is being turned in a direction to initiate the proposed turn of the vehicle, whereby the manually operated signal remains energized while the vehicle is turning, but is automatically restored when the turn is completed.

2. A directional signal controller for vehicles having a steering wheel which is adapted to make more than a full turn in each direction from the straight ahead position and a steering post, which comprises a housing attached to said steering post, a disc within said housing attached to said wheel and rotatable therewith, said disc having thereon a continuous spiral thread of more than two full turns, the number of turns corresponding to the number of complete turns of said disc when the steering wheel is turned from extreme right to extreme left positions, a double throw switch having a movable contact and a pair of stationary contacts and means engaging said thread to shift said movable contact radially so as to selectively close said stationary contacts when the steering wheel is shifted to the right or left from the straight ahead position and to open said contacts only when the steering wheel is returned to the straight ahead position regardless of the number of complete turns made from said last position, a manual double throw switch mounted in said housing and having contacts independent of said first mentioned double throw switch contacts for operating a second signal and adapted to be manually operated to selectively close its right or left contacts, and means associated with said disc and operable when the steering wheel is being restored to straight ahead position after the making of a turn to reset said manual switch, whereby straightening of the steering wheel automatically removes both the automatically operated and manually operated signals.

3. A directional signal controller for vehicles having a steering wheel which is adapted to make more than a full turn in each direction from the straight ahead position and a steering post, which comprises a housing attached to said steering post, a disc within said housing attached to said wheel and rotatable therewith, said disc having thereon a continuous spiral thread of more than two full turns, the number of turns corresponding to the number of complete turns of said disc when the steering wheel is turned from extreme right to extreme left positions, a double throw switch having a movable contact and a pair of stationary contacts and means engaging said thread to shift said movable contact radially so as to selectively close said stationary contacts when the steering wheel is shifted to the right or left from the straight ahead position and to open said contacts only when the steering wheel is returned to the straight ahead position regardless of the number of complete turns made from said last position, a manual double throw switch mounted in said housing and having contacts independent of said first mentioned double throw switch contacts for operating a second signal and adapted to be manually operated to selectively close its right or left contacts, said disc having an annular groove therein, a pin associated with said manual switch, means responsive to the operation of said switch to project said pin into said groove, and a member in said groove adapted to engage said pin when so projected for resetting said manual switch when the steering wheel is being restored to straight ahead position after the making of a turn.

4. A directional signal controller for vehicles having a steering wheel and a steering post, which comprises a housing attached to said steering post, a pair of independent double throw switch means mounted within said housing and having independent contacts to operate different signals, manual means to actuate one of said switch means, means rotating with said steering wheel to actuate the other of said switch means, said last means being adapted to restore both of said switch means to neutral position when the steering wheel is returned to a straight ahead position after the completion of a turn of the vehicle.

5. A directional signal controller for vehicles having a steering wheel and a steering post, which comprises a housing attached to said steering post, a pair of double throw switch means mounted in said housing, said switch means having independent contacts to operate different signals, manual means actuating one of said switch means, a disc within said housing attached to said wheel and rotatable therewith, means associated with said disc for actuating the other of said switch means when the steering wheel is turned to the right or left from the straight ahead position, and means associated with said disc to restore both of said switch means to neutral position when the steering wheel is returned to straight ahead position after the completion of the turn of the vehicle.

6. A directional signal controller for vehicles having a steering wheel, comprising a manual double throw switch operable by the operator of the vehicle to indicate a proposed turn to the right or left, a member rotating with said steering wheel, a reset member for said switch, said reset member being normally below the arc of movement of said rotatable member, means comprising a pair of inclined surface members adapted to elevate said reset member into position to be engaged by said rotatable member when the switch is operated to the right or left, said inclined members being depressible to permit said rotatable member to pass over the reset member when the rotatable member is turned in a direction to initiate the turn of the vehicle, whereby the switch is restored only when the turn is completed.

7. The invention set forth in claim 6 in which the inclined members comprise a pair of spring members having inclined surfaces adapted to elevate said reset member when the switch is operated to the right or left, said spring members being depressible to permit said rotatable member to pass over the reset member when the rotatable member is turned in a direction to initiate the turn of the vehicle.

8. A directional signal controller for vehicles having a steering wheel and a steering column, comprising a housing attached to and concentric with the steering column, a manual double throw switch within said housing having a handle operable by the operator of the vehicle to indicate a proposed turn to the right or left, a concentric member in said housing rotating with said steering wheel, a reset member for said switch, said reset member being within said housing and normally below the path of movement of said rotatable member and being movable upwardly into the path thereof, said reset member being shiftable with said switch to the right or left of its neutral position in the direction the rotatable member will be moved when the proposed turn of the vehicle is executed, means responsive to said shifting of the reset member to raise the same within the path of said rotatable member, said reset member being depressible when moved into said last position to permit said rotatable member to pass thereover when the rotatable member is turned in a direction to initiate the turn of the vehicle and being adapted to be engaged and returned to its initial neutral position below the path of said rotatable member by movement of said rotatable member when the rotatable member is turned toward straight ahead position, whereby the switch is restored to neutral only after the turn of the vehicle has been completed.

JAMES P. BEDFORD.